(12) United States Patent
Ross

(10) Patent No.: US 8,672,406 B2
(45) Date of Patent: Mar. 18, 2014

(54) SEAT APPARATUS

(76) Inventor: John P. Ross, Chardon, OH (US)

(*) Notice: Subject to any disclaimer, the term of this patent is extended or adjusted under 35 U.S.C. 154(b) by 208 days.

(21) Appl. No.: 13/156,732

(22) Filed: Jun. 9, 2011

(65) Prior Publication Data

US 2011/0304187 A1 Dec. 15, 2011

Related U.S. Application Data

(60) Provisional application No. 61/353,454, filed on Jun. 10, 2010.

(51) Int. Cl.
| | | |
|---|---|---|
| *A47C 1/023* | (2006.01) | |
| *A47C 3/20* | (2006.01) | |
| *A47C 1/024* | (2006.01) | |
| *A62B 35/00* | (2006.01) | |
| *A45F 4/02* | (2006.01) | |

(52) U.S. Cl.
USPC ............ 297/344.24; 297/344.13; 297/344.15; 297/344.18; 297/354.12; 297/465; 244/155

(58) Field of Classification Search
USPC ................. 297/344.24, 465, 440.15, 354.12, 297/440.2, 284.4, 344.12, 344.15, 344.18; 224/155

See application file for complete search history.

(56) References Cited

U.S. PATENT DOCUMENTS

| | | | | |
|---|---|---|---|---|
| 3,718,365 | A * | 2/1973 | Gibson | 297/344.24 |
| 4,091,479 | A * | 5/1978 | Hancock | 4/560.1 |
| 4,487,345 | A * | 12/1984 | Pierce et al. | 224/155 |
| 5,409,291 | A * | 4/1995 | Lamb et al. | 297/129 |
| 5,498,065 | A * | 3/1996 | Tosoni | 297/440.21 |
| 5,695,099 | A * | 12/1997 | Strum | 224/155 |
| 7,131,692 | B2 * | 11/2006 | Huang | 297/250.1 |
| 7,438,355 | B2 * | 10/2008 | Pedemonte | 297/17 |
| 2008/0078789 | A1 * | 4/2008 | Fiola | 224/155 |
| 2009/0243345 | A1 * | 10/2009 | Carter et al. | 297/16.2 |

* cited by examiner

*Primary Examiner* — Milton Nelson, Jr.
(74) *Attorney, Agent, or Firm* — Kegler Brown Hill & Ritter; James J. Pingor

(57) ABSTRACT

A seating apparatus that is capable of both sliding and pivoting thereby lending to advantageously positioning a hunter in relation to their prey. By enabling a seat portion to horizontally slide along a plane, the hunter can reposition away from an object, e.g., a tree. Additionally, the seat portion of the apparatus is capable of pivoting in either direction thereby enhancing line of sight to hunting game.

8 Claims, 17 Drawing Sheets

SEAT APPARATUS

CROSS-REFERENCE TO RELATED APPLICATIONS

This application claims the benefit of U.S. Provisional Patent application Ser. No. 61/353,454 entitled "SEAT APPARATUS" and filed Jun. 10, 2010. The entirety of the above-noted application is incorporated by reference herein.

BACKGROUND

Hunting is a practice of pursuing animals or wildlife with the intention of capturing or killing the animal for sport or trade. Today, hunting is regulated and, most often, licenses are issued to approved hunters, as distinguished from poachers, who attempt to killing, trapping or capturing the hunted species contrary to applicable law. In the United States, the hunted animals or "game" are usually mammals and birds, migratory and non-migratory.

One particular type of hunting is that of wild turkey. Wild turkeys are hunted in 49 States and three Canadian Provinces, among others. Many of these places offer dual turkey hunting seasons, spring and fall. Hunting wild turkey is somewhat challenging due to the acute senses of wild turkeys. In particular, wild turkeys have excellent visual acuity, as well as the ability to see color, meaning that head-to-toe camouflage is essential. While in the woods, hunters often position themselves behind trees or other barriers that lend to further camouflage or concealment of the hunter.

In addition to the hunter's weapon, turkey hunters often equip themselves with a turkey vest to assist in organizing and carrying calls, decoys, ammunition, etc. A turkey vest is a kind of hunting clothing specially designed for turkey hunting. In order to accommodate the specific needs in this outdoor activity, the vests are often designed with an abundance of individually- and assorted-sized pockets, both inside and outside the vest. These pockets are used to accommodate from small items like turkey calls or ammunition shells to larger gear like binoculars and such.

For comfort while seated against a tree or other structure, many of the vests are designed with a built-in seat pad. Most turkey hunters can appreciate the value of the seat pad since, more often than not, it takes a long time for a wary gobbler to respond to hunter's call and wander within the line of sight or shooting distance. A seat pad has become an essential element of gear to keep hunters off the hard, sometimes cold, ground. While conventional seat pads are more comfortable than sitting directly upon the ground, there exists a need in the art for more effective, yet comfortable, seating options.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a seating apparatus that is capable of both sliding and pivoting thereby lending to advantageously positioning a hunter in relation to their prey. By enabling a seat portion to horizontally slide along a plane, the hunter can reposition away from an object, e.g., a tree. Additionally, the seat portion of the apparatus is capable of pivoting in either direction thereby enhancing line of sight to hunting game.

In another aspect of the subject innovation a ring or set of rings can be positioned around a tree having a seating portion connected thereto. The seating portion can be of most any height so as to accommodate sitting or straddling positions. The seating portion is capable of rotation about the rings in either direction and throughout the complete perimeter of the tree. It will be appreciated that this apparatus can enhance a hunter's vantage point to prey.

In yet other aspects, the legs or supports can be adjustable or height or inclination. As well, the supports can pivot inward or outward. Further, the apparatus can be incorporated into a backpack or vest-like apparel which enables a hunter to efficiently transport the apparatus to and from a hunt site.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
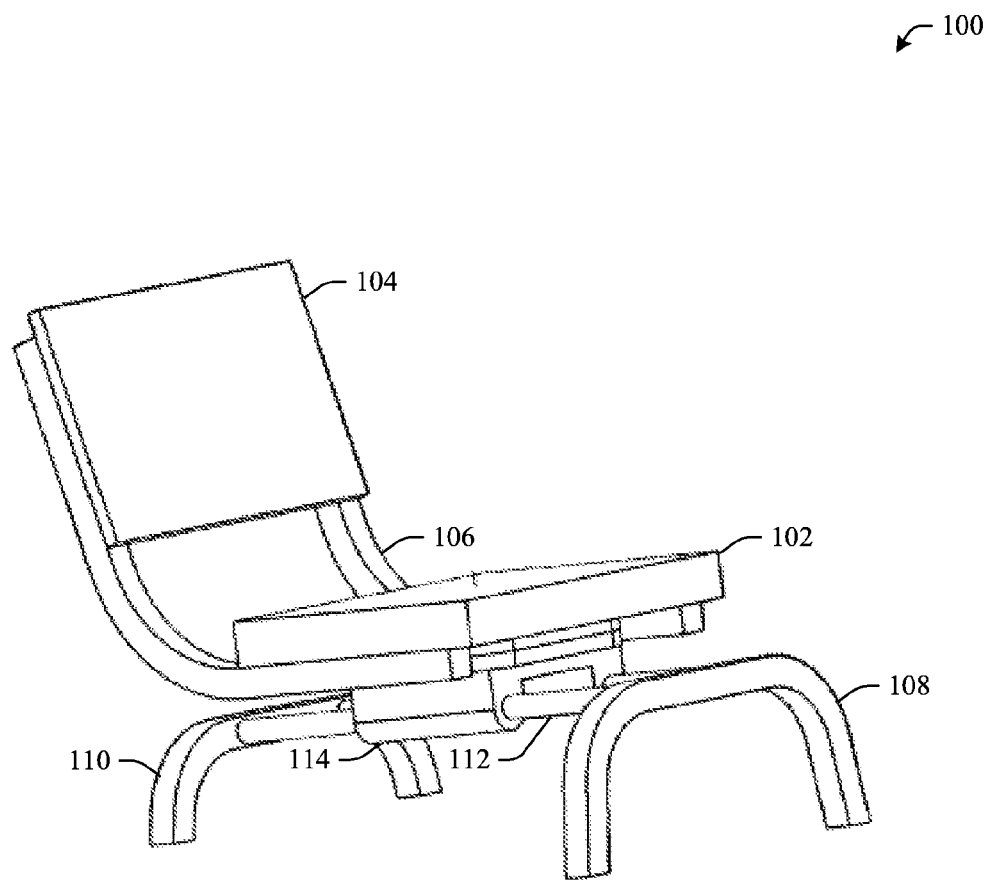
FIG. 1 illustrates a front perspective view of an example seating apparatus in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

Referring initially to the drawings, FIG. 1 illustrates an example seating apparatus 100 in accordance with aspects of the innovation. As shown, the apparatus 100 can include a seat or bottom portion 102 and an upper or backrest portion 104. The backrest portion 104 is supported by frame member(s) 106 as shown. While specific structural considerations are shown and described herein, it is to be appreciated that alternatives may be employed without departing from the spirit and/or scope of this specification.

As will be described infra, the bottom portion 102 and backrest portion 104 can swivel 360° (or portions thereof) in either direction so as to enhance position of an individual's line of sight. While much of this disclosure is directed to hunting, and specifically wild turkey hunting, it is to be appreciated that the features, functions and benefits can be realized and used in other scenarios, e.g., bird watching, photography or the like.

As illustrated, the seat portion (102, 104, 106) can be supported by two pairs of legs, front 108 and rear 110. As shown, the front legs 108 can be longer so as to position the seating apparatus 100 in a recline-like position. It is to be understood that, although recline-like in some aspects, e.g., on level ground, the front and rear legs (108, 110) can enable level (or near level) seating on ground that is not level, which is most often the case near tree trunks. It is to be understood that the components of the seating apparatus 100 can be manufactured of most any suitably rigid materials including, but not limited to, aluminum, alloys, plastics, composites, carbon-fiber, wood or the like.

In addition to the 360° swivel, the seating apparatus 100 can be equipped with a pair of rails 112 upon which a slide mechanism 114 can travel. It will be understood that the slide mechanism 114 can employ a self-lubricating material so as to reduce maintenance while prolonging longevity of the slide. In operation, the seating portion (102, 104, 106) can slide in a planar (e.g., substantially horizontal) manner. This sliding feature will be better understood upon a review of the figures that follow. While a slide mechanism 114 is illustrated and described, it is to be understood that alternative aspects can employ wheels or other mechanisms that enable horizontal (or near horizontal) motion. These alternatives are to be included within the scope of this disclosure and claims appended hereto.

Figure 2:
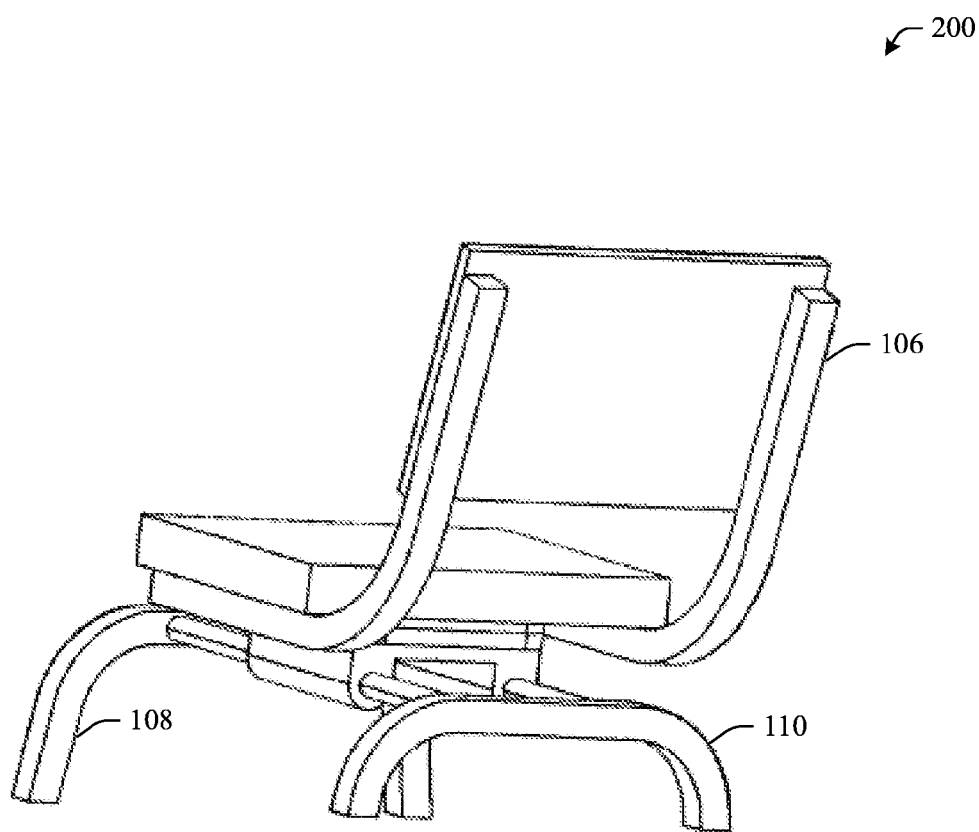
FIG. 2 illustrates a rear perspective view of an example seating apparatus in accordance with aspects of the innovation.

FIG. 2 illustrates a rear perspective view of a seating apparatus 200 in accordance with an aspect. It will be understood that the front and rear supports or leg portions, 108, 110, can be equipped with height adjusters. For example, the legs (108, 110) can be equipped with a telescoping feature to as to adjust height, and/or angle, of the apparatus 200. Still further, although not shown, the legs, 108, 110, can be equipped with a hinging or other folding feature so as to enable the legs 108, 110 to fold, e.g., inward or outward, e.g., for ease of storage and transport. The frame member(s) 106 can also be equipped with a hinging or folding feature (not shown) so as to accommodate storage and/or transport.

Figure 3:
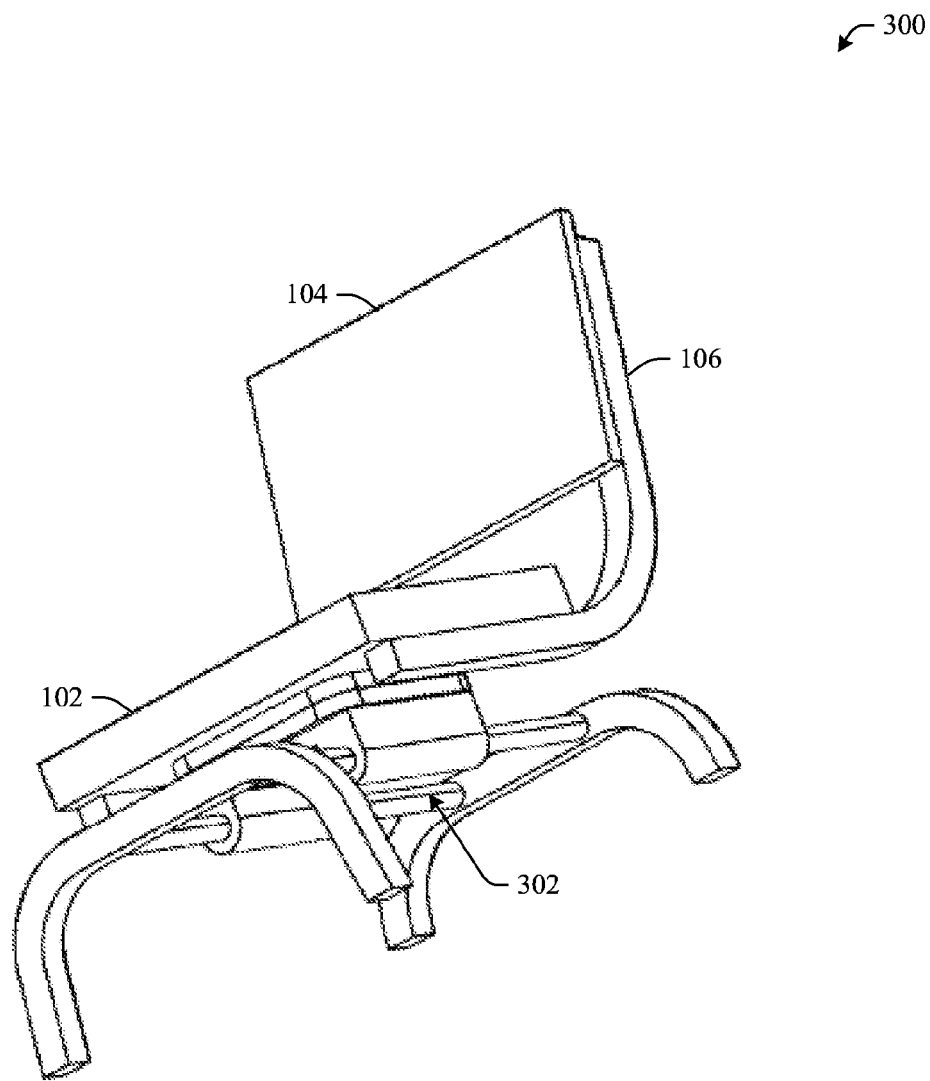
FIG. 3 illustrates a front perspective view of an example seating apparatus in accordance with aspects of the innovation.

FIG. 3 illustrates another perspective view of an example seating apparatus 300 in accordance with aspects of the innovation. As shown, the seating apparatus 300 can be equipped with a swivel 302 that enables the seating portion (102, 104, 106) to swivel 360° (or other desired range) in either direction. In examples, the swivel 302 can be a bearing, e.g., ball bearing swivel device. Other swivel mechanisms can be employed in alternative aspects.

Figure 4:
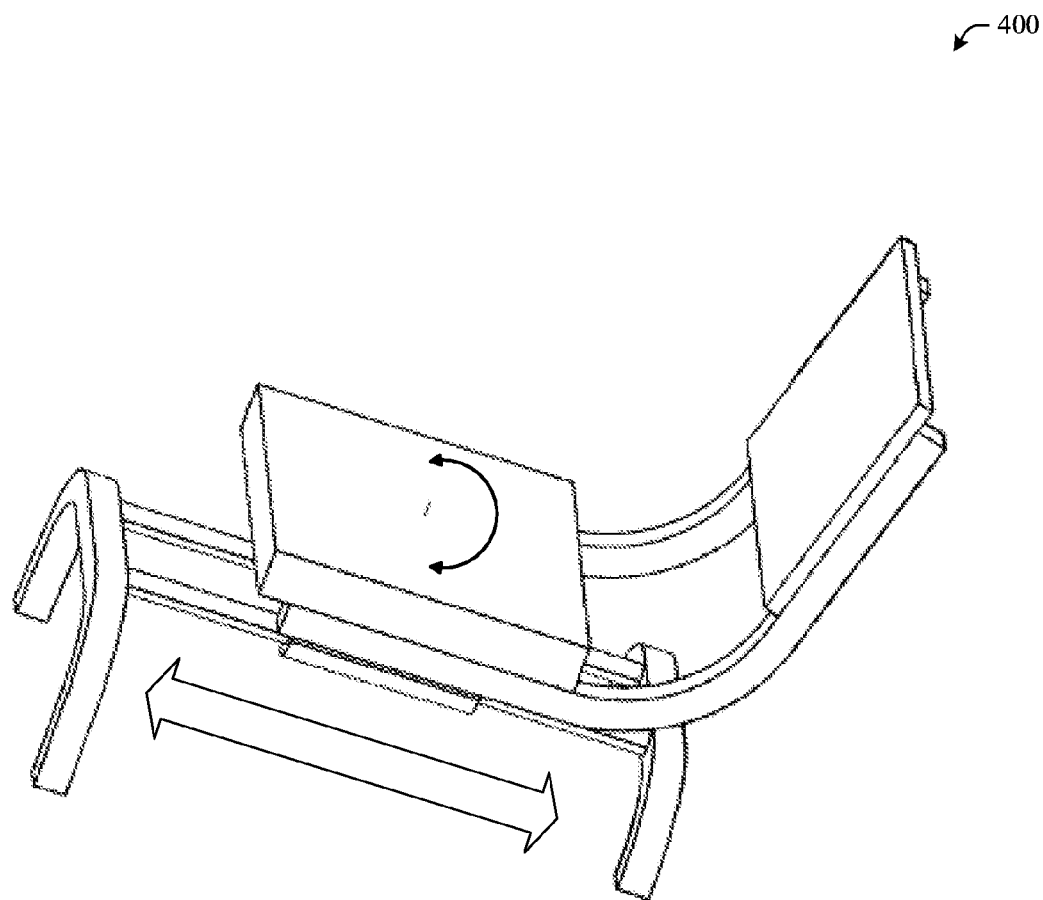
FIG. 4 illustrates a top down perspective view of an example seating apparatus in accordance with aspects of the innovation.

FIG. 4 illustrates an alternative aspect of an example seating apparatus 400 in accordance with aspects of the innovation. As shown by the arrows, the seating portion of the apparatus 400 can swivel and slide as shown. Those skilled in the art can appreciate the value of these adjustment features.

Figure 5:
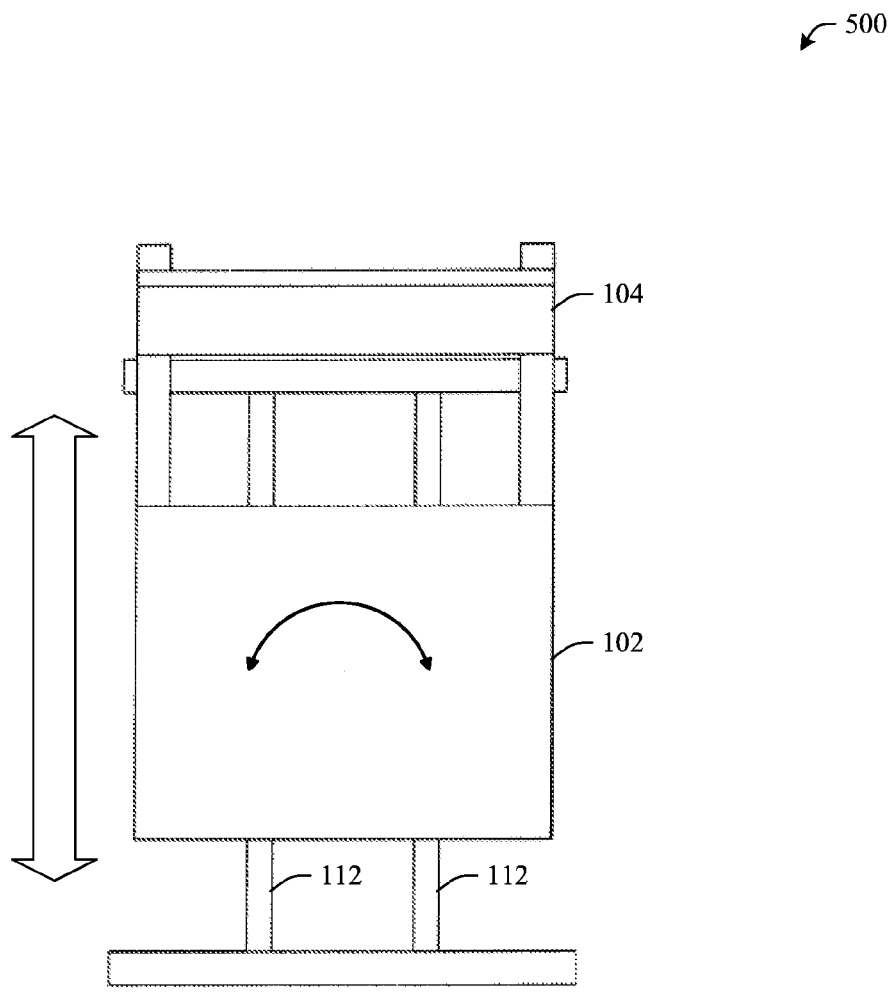
FIG. 5 illustrates an overhead perspective view of an example seating apparatus in accordance with aspects of the innovation.

FIG. 5 illustrates a top-down perspective view of an example seating apparatus 500. As shown the bottom portion 102 and backrest portion 104 can rotate in either direction. Additionally, these components, 102, 104, can slide upon rails 112 in a linear direction. While two rails are shown, it is to be understood that more or less rails can be employed without departing from the features, functions and benefits of the innovation.

Figure 6:
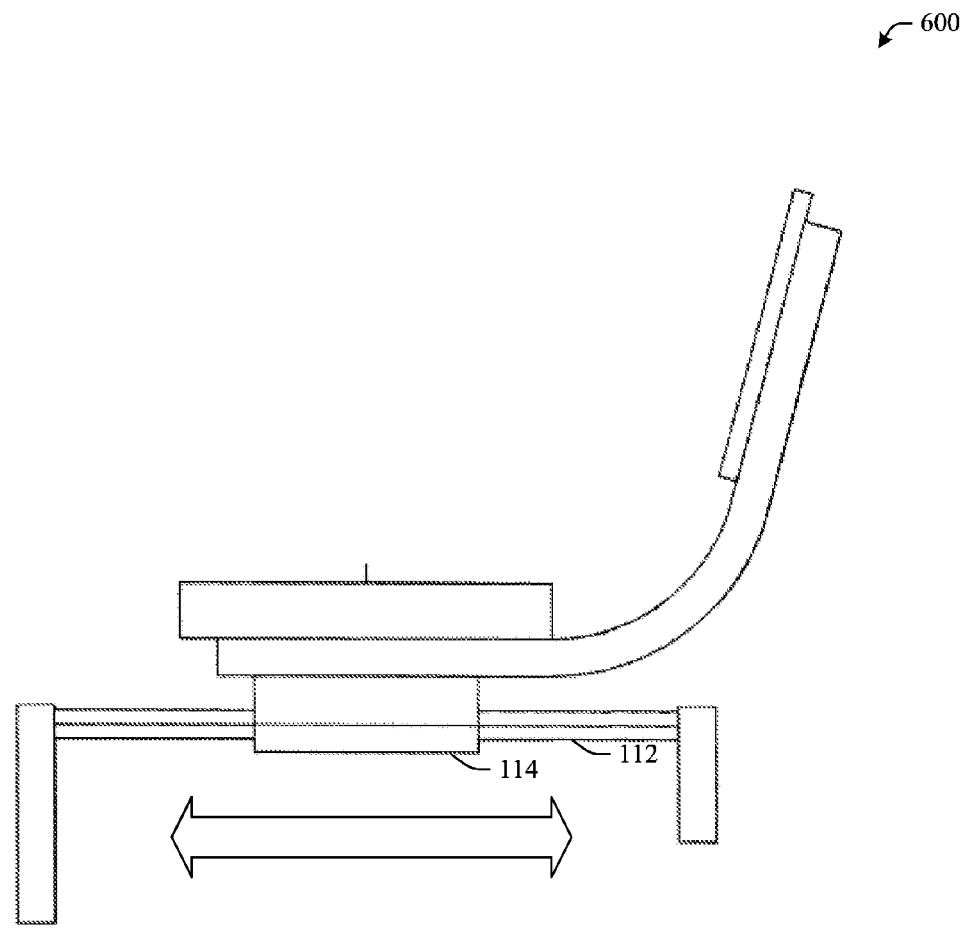
FIG. 6 illustrates a side perspective view of an example seating apparatus in accordance with aspects of the innovation.
Figure 7:
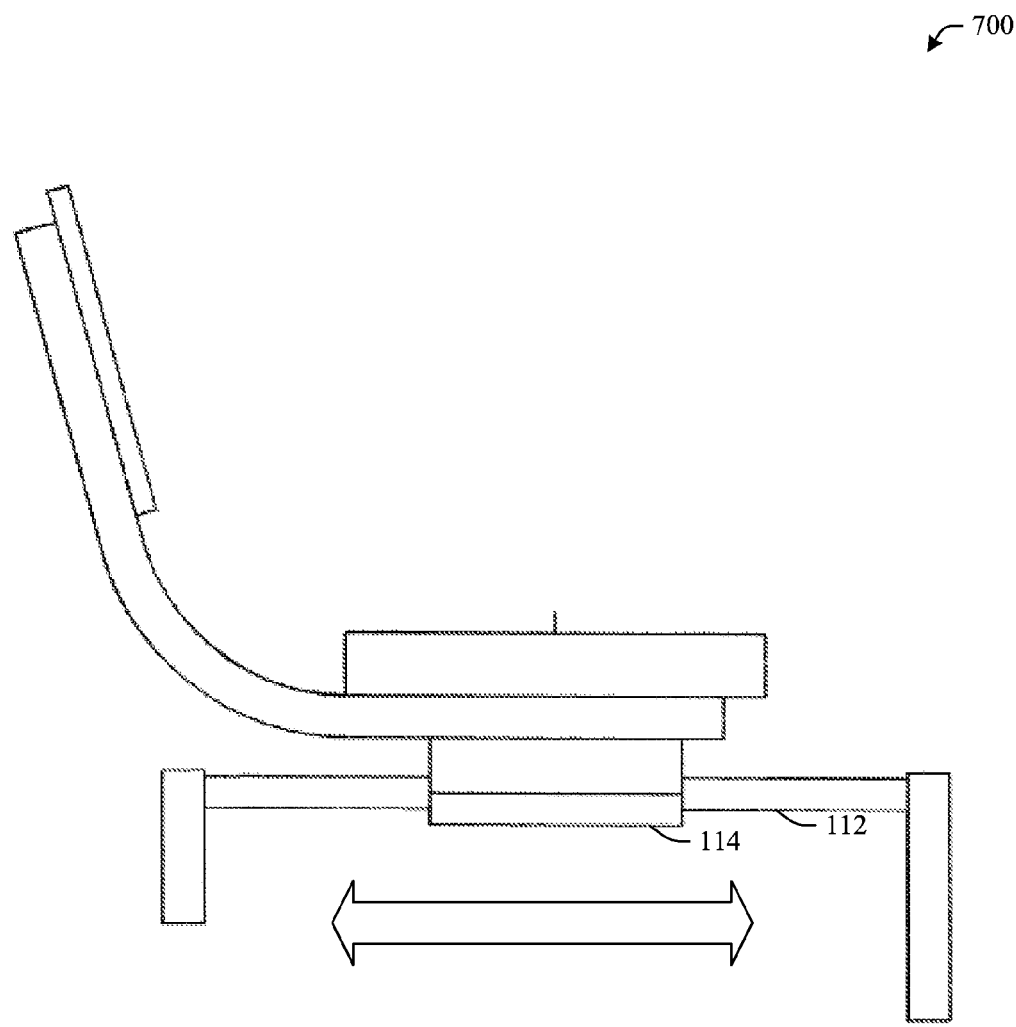
FIG. 7 illustrates a side perspective view of an example seating apparatus in accordance with aspects of the innovation.

FIGS. 6 and 7 illustrate side perspective views of an example seating apparatus 600 and 700. As shown, the slide mechanism 114 can travel along the rail(s) 112 to adjust the seating portion in a planar and substantially horizontal manner. It will be understood that the horizontal sliding functionality can enable a user to increase their distance from an object, e.g., tree trunk. In other words, a hunter that is initially seated with their back against a tree can slide horizontally away from the base of the tree, and swivel 180° thereby positioning their legs facing the tree and increasing their line of sight.

Figure 8:
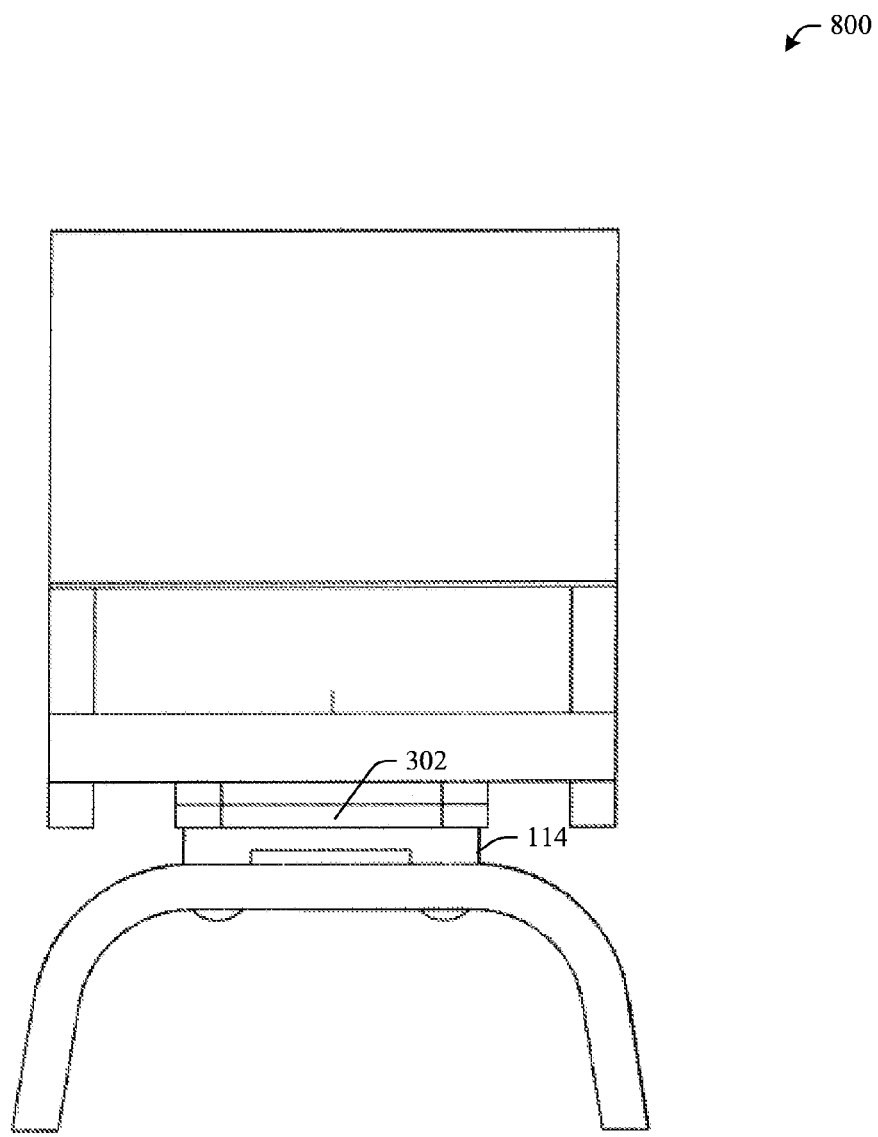
FIG. 8 illustrates a back perspective view of an example seating apparatus in accordance with aspects of the innovation.

FIG. 8 illustrates a rear perspective view of a seating apparatus 800 in accordance with aspects of the innovation. Here, the swivel mechanism 302 is shown to be positioned above the slider mechanism 114. This placement will be better understood upon a review of FIG. 9 that follows.

Figure 9:
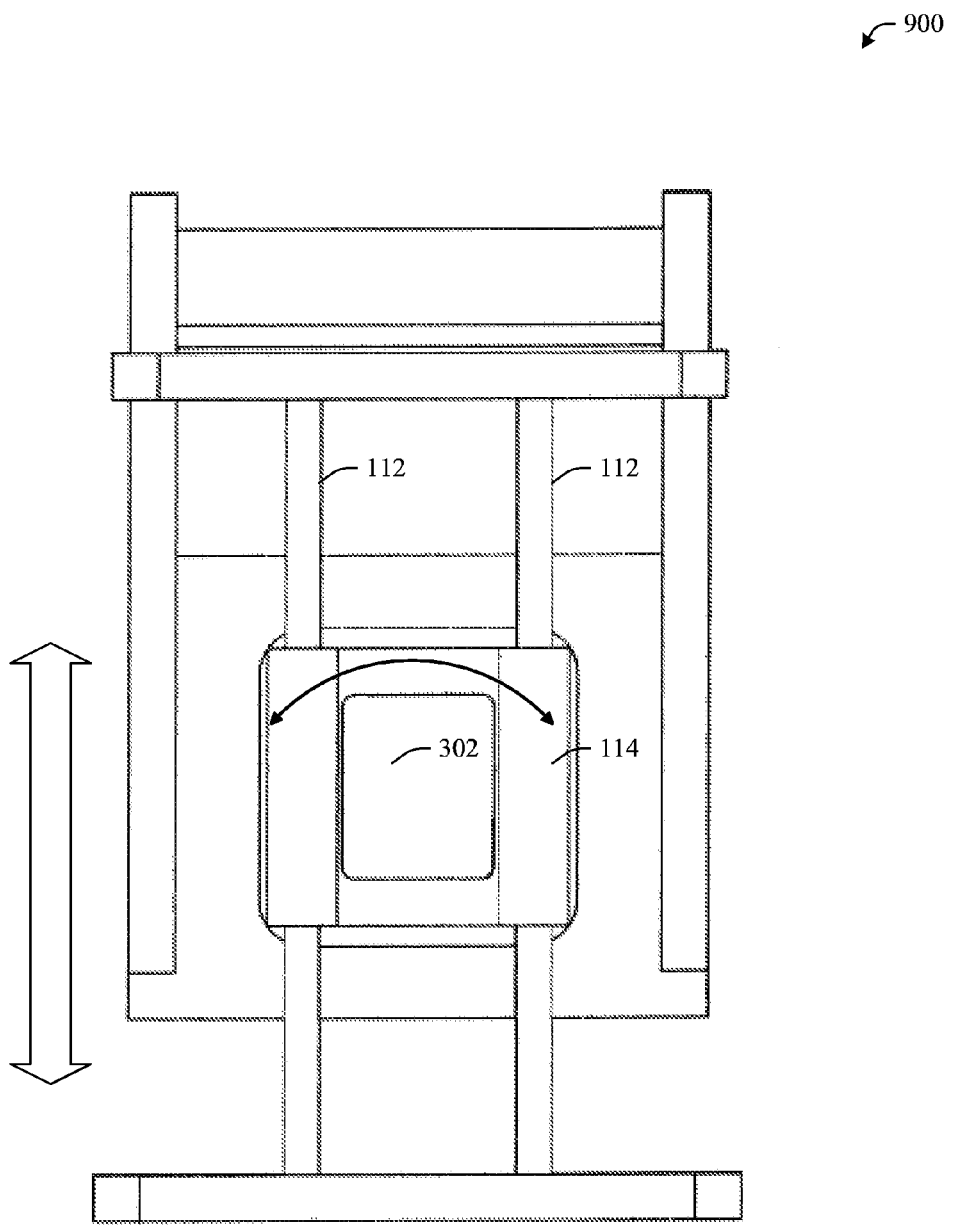
FIG. 9 illustrates a bottom perspective view of an example seating apparatus in accordance with aspects of the innovation.

FIG. 9 illustrates a bottom-side perspective view of a seating apparatus 900 in accordance with aspects of the innovation. Here, as shown, the swivel mechanism 302 can be positioned in (or near) the center of the slider mechanism 114. As previously described, the slider mechanism 114 can travel along the pair of rails 112 as indicated.

Figure 10:
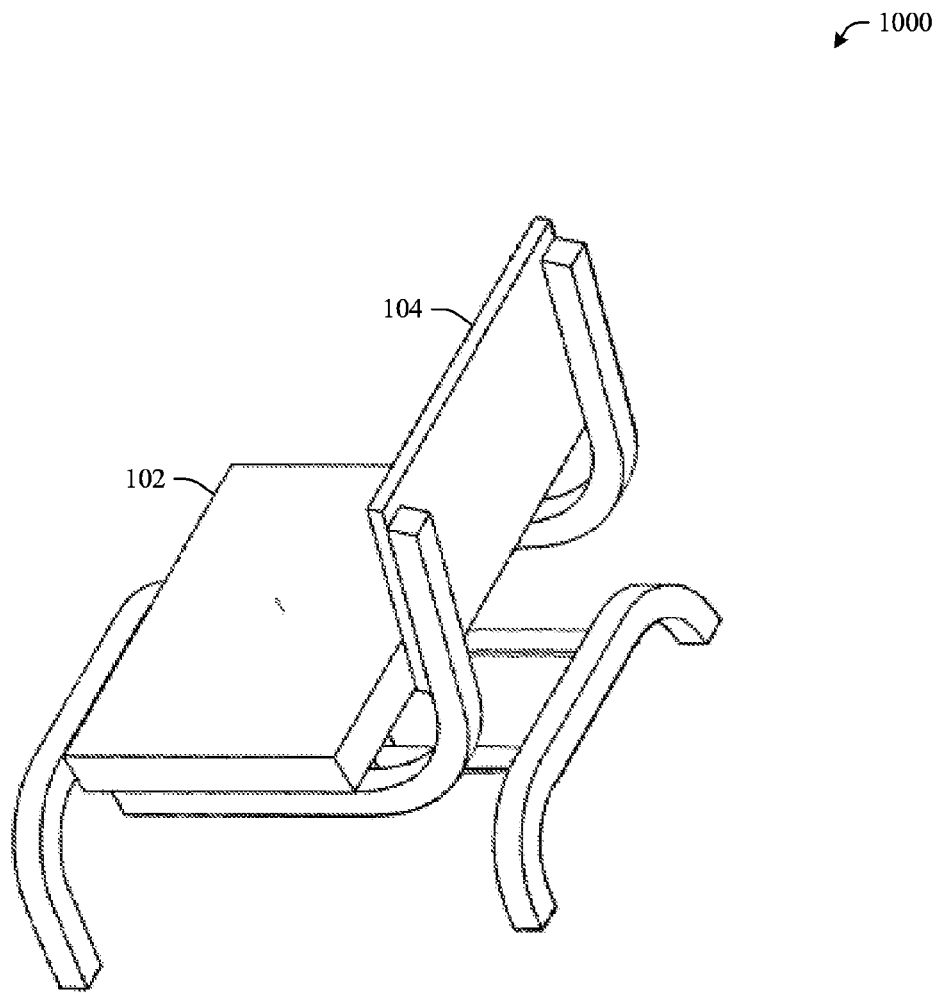
FIG. 10 illustrates a top-down perspective view of an example seating apparatus in accordance with aspects of the innovation.

FIG. 10 illustrates yet another perspective view of an example seating apparatus 1000 in accordance with aspects of the innovation. It will be understood that, upon transport, the apparatus 1000 can be equipped with a carry strap or straps (not shown) such that, when carried, the bottom portion 102 and the backrest portion 104 wrap around one's body thereby enhancing portability.

Figure 11:
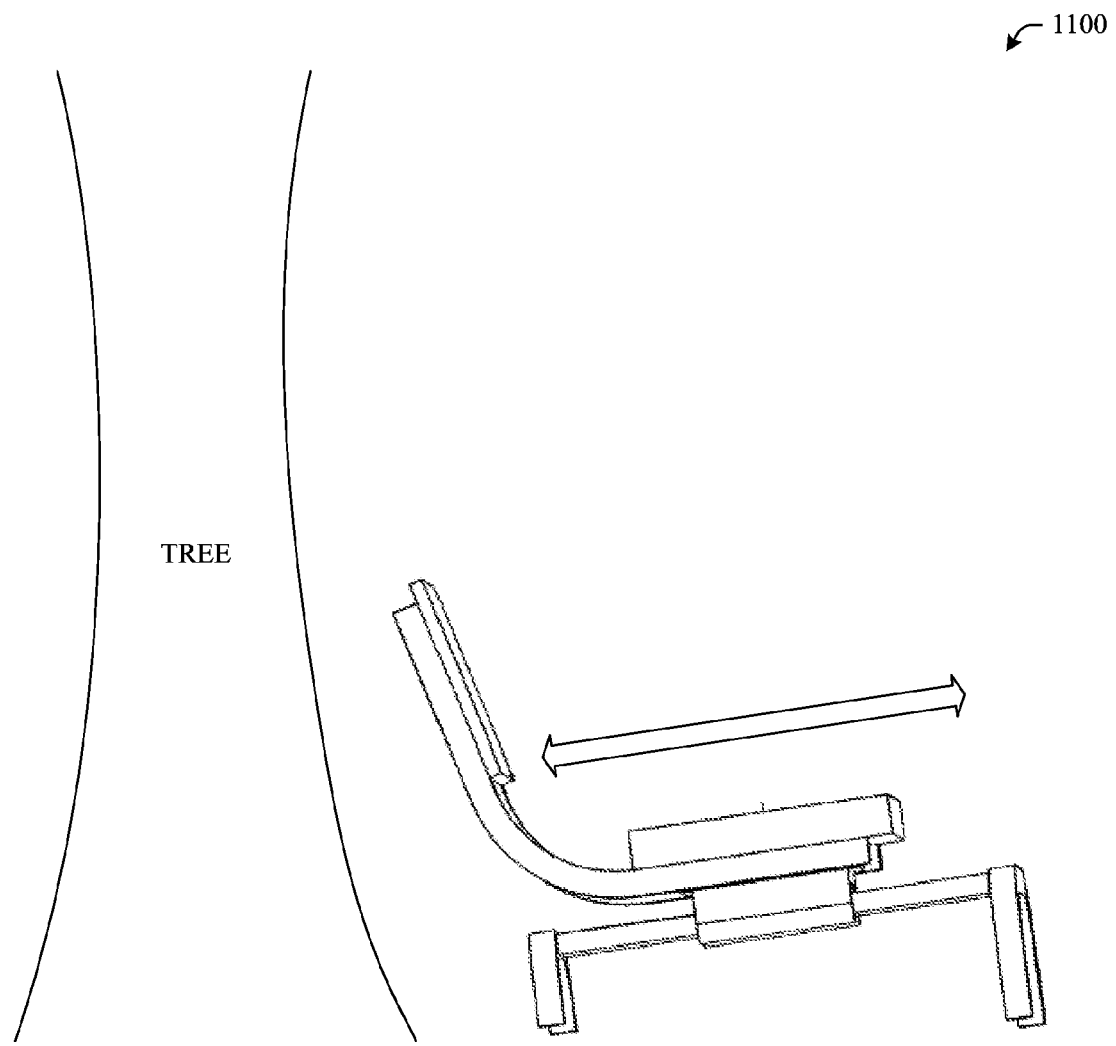
FIG. 11 illustrates an example placement of a seating apparatus in accordance with aspects of the innovation.

FIG. 11 illustrates an example implementation 1100 of a seating apparatus in accordance with aspects. As will be understood, a hunter can position himself with his back against a tree thereby hiding from approaching prey. If an animal approaches from behind, the hunter can slide the seat portion forward as shown and swivel to enhance or enable line of sight. From this vantage point, the hunter can enhance visibility and increase probability of success in shooting at the game, e.g., wild turkey.

Figure 12:
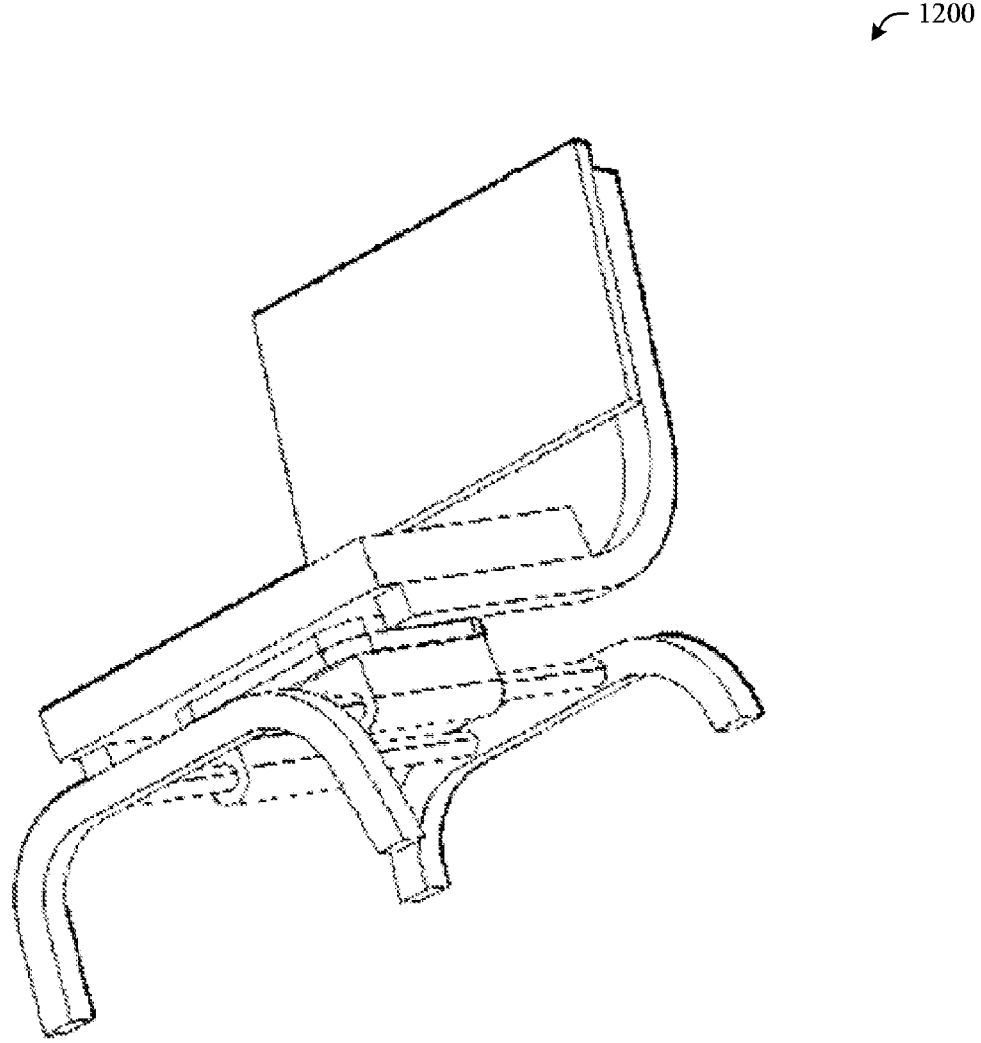
FIG. 12 illustrates a front perspective view of an example seating apparatus in accordance with aspects of the innovation.

FIG. 12 illustrates yet another example seating apparatus 1200 in accordance with aspects of the innovation. As discussed supra, the legs can be adjustable as well as collapsible as desired. Although not shown, it is to be understood that the supports or legs can employ hinging means so as to enable height adjustability and/or collapsibility. Similarly, the backrest can be adjustable or collapsible as desired. Still further, it will be appreciated that other aspects can be employed without a backrest portion if desired. Similarly, the backrest portion can be configured in a removable manner to enhance adaptability of the apparatus 1200.

Figure 13A:
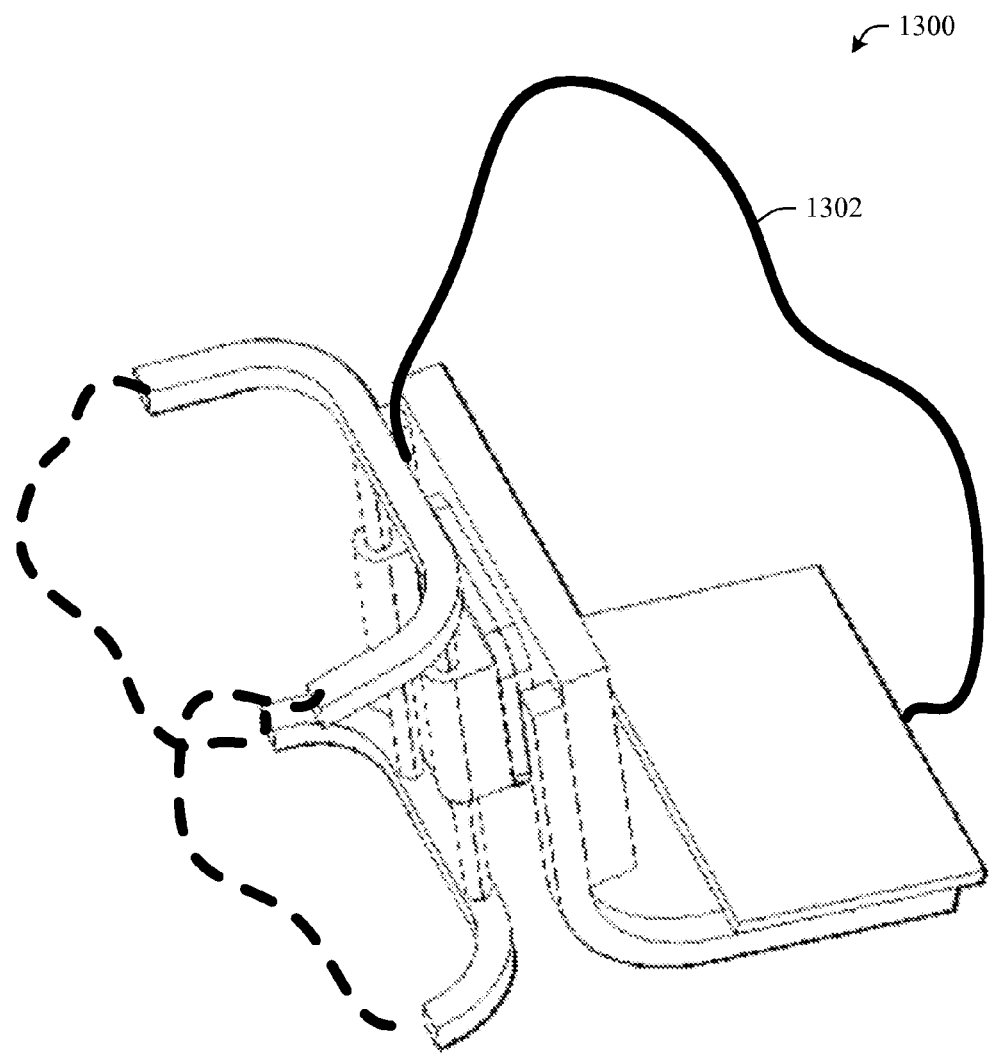
FIG. 13A illustrates an example carry strap an embodiment in accordance with aspects of the innovation.
Figure 13B:
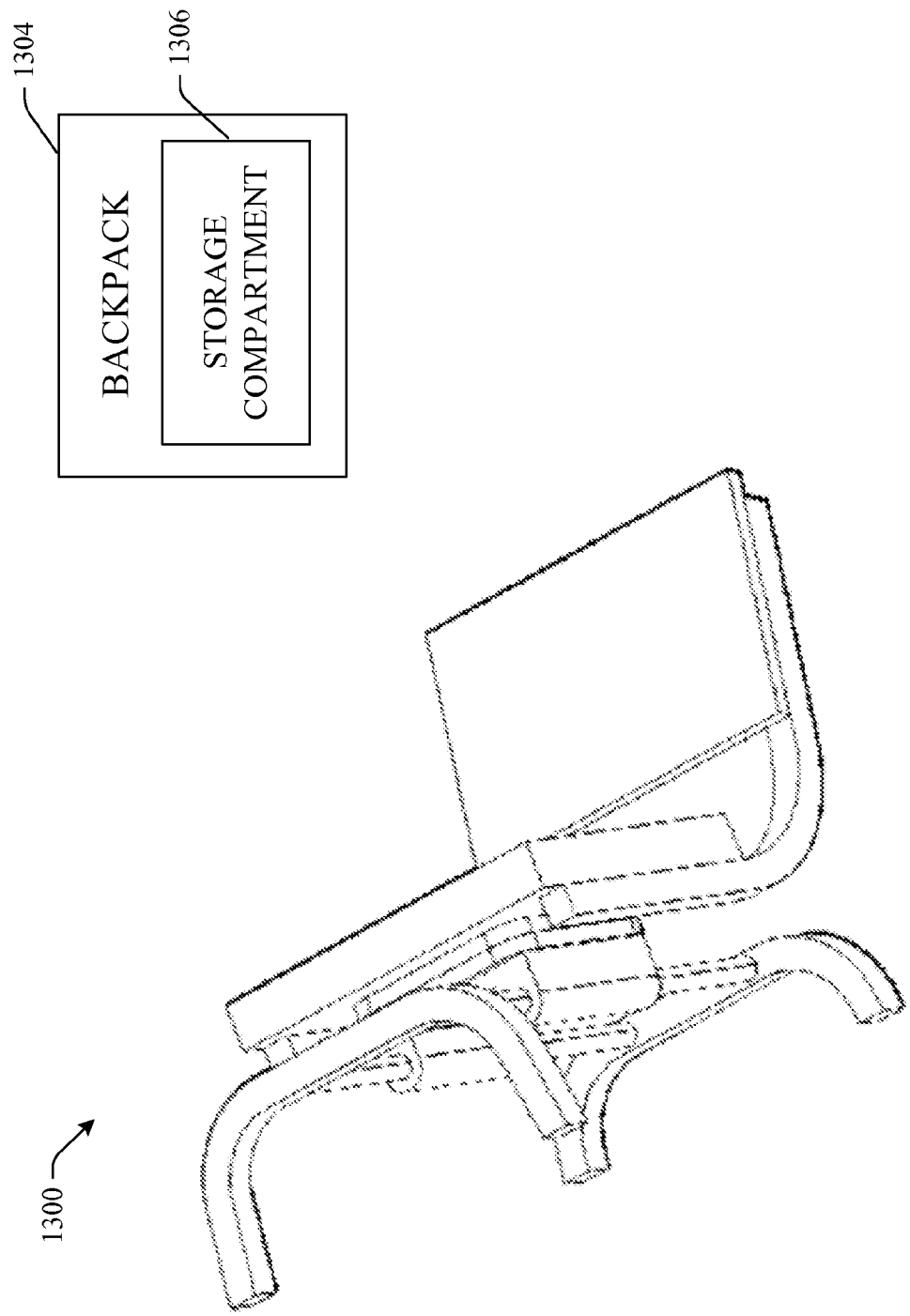
FIG. 13B illustrates an example embodiment of a seat apparatus including a backpack in accordance with aspects of the innovation.

FIGS. 13A and 13B illustrate still another aspect of a seating apparatus 1300. As shown, the seating apparatus 1300 can be equipped with a carry strap 1302 to enhance portability. While a single strap 1302 is shown, it will be understood that, alternatively, multiple straps can be employed in other aspects. For example, the device can be equipped with two straps so as to enable transport in a backpack-like manner. In this example, the leg portions can be wrapped about (or collapsed) the wearer and straps can be worn on the shoulders. Similarly, the backrest portion can be collapsed or removed to enhance transport. These alternative backpack-like straps are illustrated by dashed lines of FIG. 13A. Additionally, if desired, a waist strap can also be employed. It will be understood and appreciated that the apparatus 1300 can be configured into or with a backpack 1304 having pockets and other storage compartments 1306 thereby enhancing utility and functionality of the innovation, as shown in FIG. 13B.

Further, the apparatus (e.g., 1300) can be incorporated into apparel such as a vest, jacket or the like. In one particular aspect, the apparatus can be incorporated into a vest such as a turkey hunting vest. It will be appreciated that a typical hunting vest includes compartments and pockets, for example, to store ammunition, animal calls, snacks, and other hunting-related equipment. In operation, in aspects, the flaps of the vest can be laid upon the ground on either side of the seating apparatus. It will be understood that this positioning enables of the pockets and compartments such that a user can easily and efficiently reach equipment or other items as needed or desired.

Figure 14:
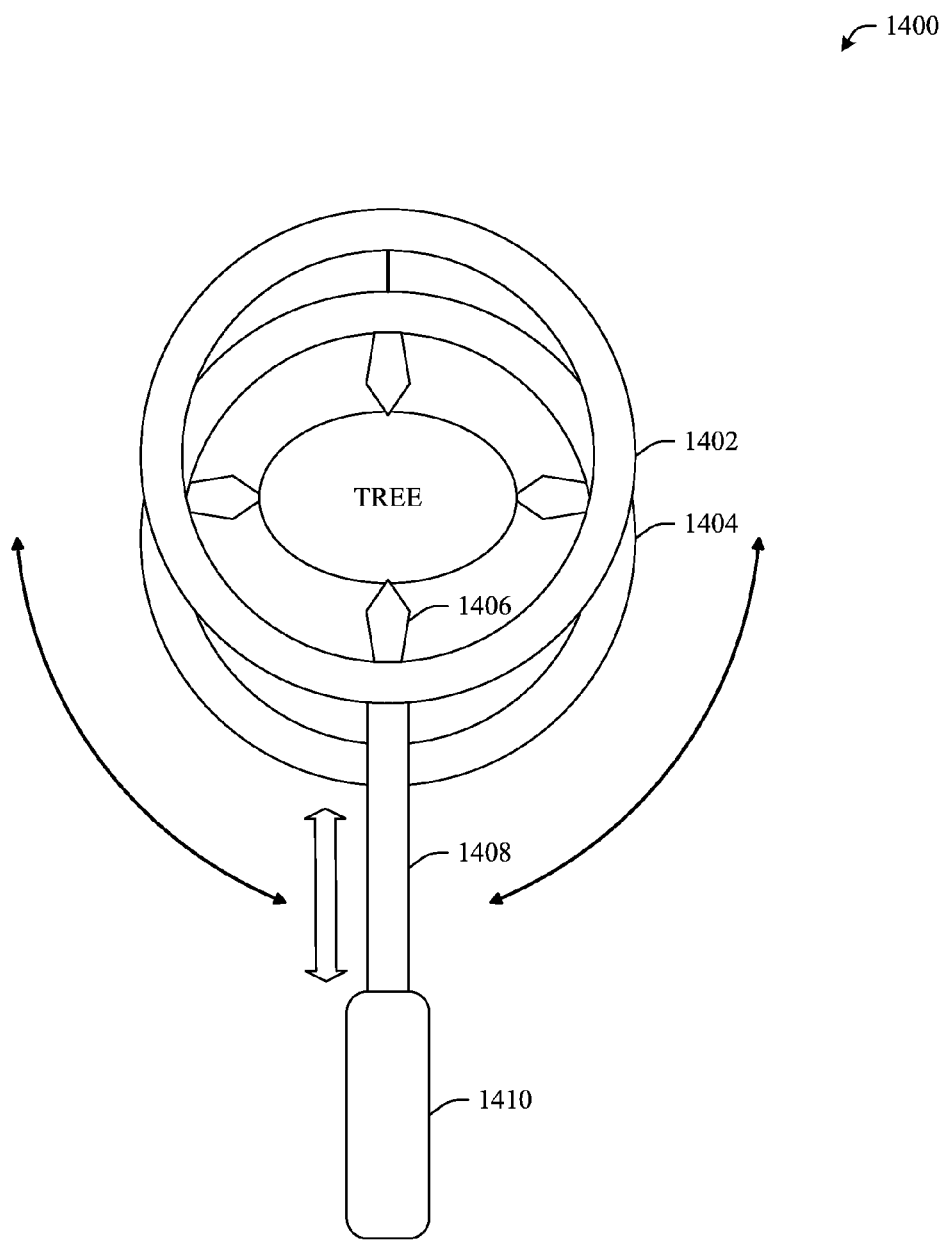
FIG. 14 illustrates a top-down perspective view of an example seating apparatus in accordance with aspects of the innovation.

FIG. 14 illustrates yet another configuration of a seating apparatus 1400 in accordance with the innovation. Similar to the guides (102 of FIG. 1), the apparatus 1400 can be equipped with circular guides or rails 1402, 1404. While two rings 1402, 1404 are shown, other aspects can employ more or fewer rings as appropriate for design applications without departing from the features, functions and benefits of the innovation. Similar to the guides or rails described above (102 of FIG. 1), the circular guides (1402, 1404) can be tubular, square, notched or most any other suitable configuration that enable a seating portion to traverse around the guides or rails (1402, 1404).

As illustrated, the rings 1402, 1404 can be equipped with attachment means 1406 that adjust to accommodate most any diameter of tree. These attachment means 1406 can include a spike, pad, or like. A seating arm 1408 can be slidably attached to either or both of the rings 1402, 1404 such that the arm 1408 can travel 360° around the ring (1402, 1404). A seat portion 1410 can be affixed to the other end of the arm 1408 as shown. In this example, a user can sit atop the seat portion 1410 or, in alternative aspects, can straddle the seat portion 1410 in a standing position. The seat portion 1410 (and arm 1408) can be adjustable inward and outward in relation to the rings 1402, 1404 as appropriate or desired.

In addition to the functionality of the aspects described herein, it is to be understood that both of the embodiments described in detail can be equipped with a camera or gun (e.g., rifle) mount as desired. These mounts can, for example, be mounted together with the seat thereby traversing along with the seat portions. Still further, it is to be understood that the aspect shown in FIG. 14 can be equipped with a camera mount in lieu of a seat portion. This camera-only embodiment can be used to promote camera use by a hunter, bird watcher, photographer, etc.

Figure 15:
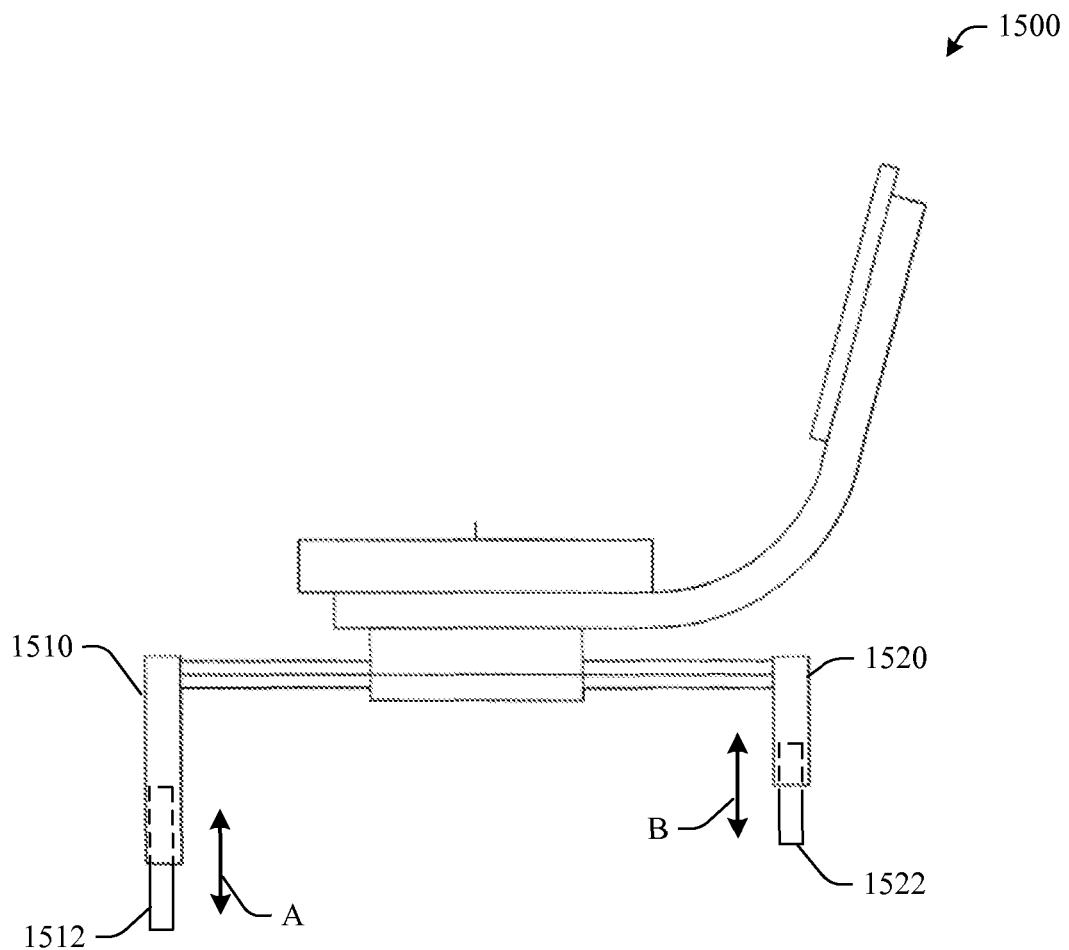
FIG. 15 illustrates a side-view of an example seating apparatus showing telescoping legs in accordance with an aspect of the innovation.

Referring to FIG. 15, as mentioned above, the seat apparatus 1500 can include telescoping front and/or rear legs 1510, 1520. The front legs 1510 can include a movable part 1512 that telescopes into and out of the leg 1510 as shown by the arrow A. Similarly, the rear legs 1520 can include a movable part 1522 that telescopes into and out of the leg 1520 as shown by the arrow B.

Figure 16:
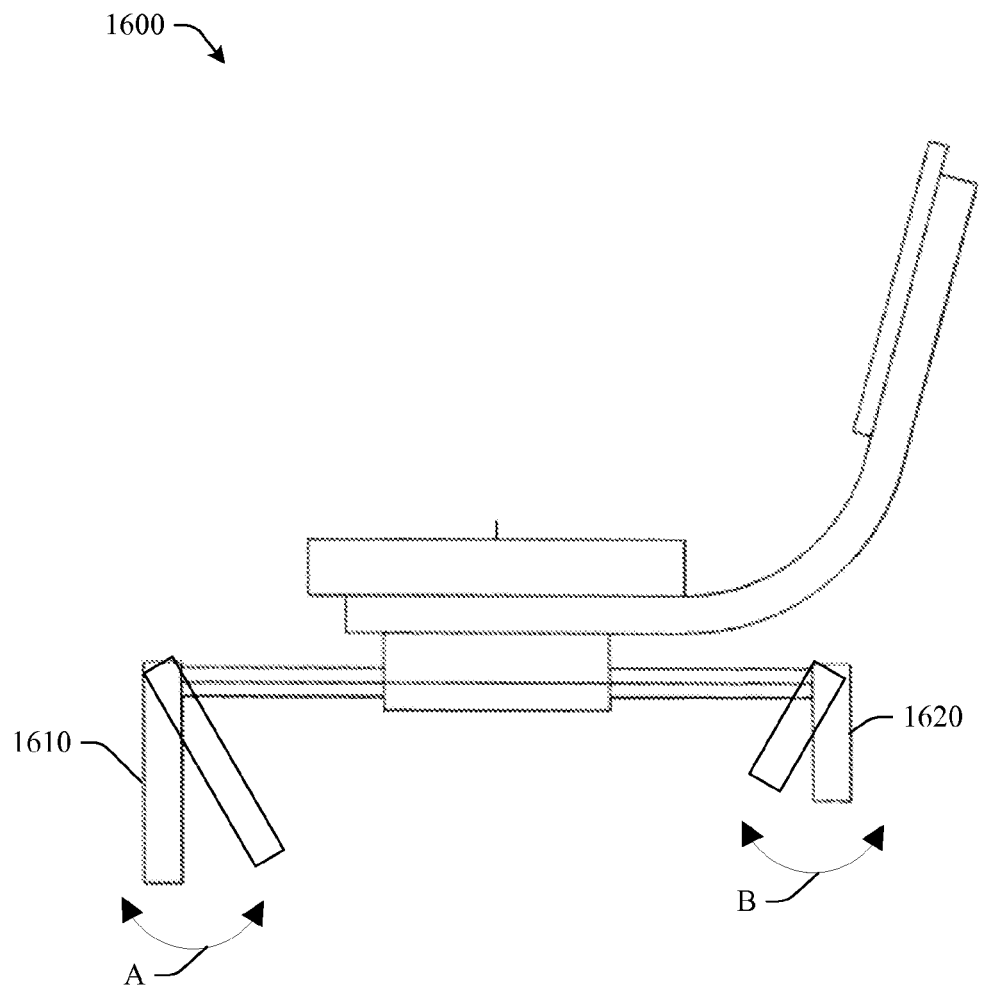
FIG. 16 illustrates a side-view of an example seating apparatus showing pivoting legs in accordance with an aspect of the innovation.

Referring to FIG. 16, as mentioned above, the seat apparatus 1600 can include front and/or rear legs 1610, 1620 that rotate or fold inward illustrated by the arrows A and B respectively to facilitate storage and/or transport.

What has been described above includes examples of the innovation. It is, of course, not possible to describe every conceivable combination of components for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A seating apparatus, comprising:
   a seat bottom portion;
   a seat backrest portion removeably connected to the seat bottom portion;
   a first pair of support members disposed at a front of the seat bottom;
   a second pair of support members disposed at a rear of the seat bottom;
   a pair of rails affixed to the first and second pair of support members and parallel to a length of the seat bottom portion having a common plane with the seat bottom portion;
   a slider mechanism that traverses along the pair of rails in the plane parallel to the seat bottom portion, wherein the seat bottom portion is mounted atop the slider mechanism;
   a swivel mechanism that enables the seat bottom portion to rotate about a pivot point
   a backpack having at least one storage compartment affixed to the seat bottom portion and/or the seat backrest portion.

2. The apparatus of claim 1, wherein the slider mechanism includes a self-lubricating means that lubricates for traversal along the pair of rails.

3. The apparatus of claim 1, wherein the pivot point enables rotation 360° in either direction.

4. The apparatus of claim 1, wherein the backrest portion is adjustable for inclination.

5. The apparatus of claim 1, wherein the first pair of support members and/or the second pair of support members include hinging means that facilitate height adjustment or collapsibility.

6. The apparatus of claim 1, further comprising a vest fixedly attached to the apparatus, wherein the vest facilitates transport or access to equipment.

7. The apparatus of claim 1, wherein at least the first pair of support members and/or the second pair of support members employ telescoping means that facilitate height adjustment.

8. The apparatus of claim 1, wherein the first pair of support members and/or the second pair of support members are collapsible in an inward or outward direction.

\* \* \* \* \*